Hammond & Reeves,

Truss Bridge.

No. 2701. Reissued July 30. 1867.

David Hammond
W. R. Reeves
} Inventors

Job Abbott
E. R. Beebert
} Witnesses

N. PETERS, PHOTO-LITHOGRAPHER, WASHINGTON, D. C.

United States Patent Office.

DAVID HAMMOND AND W. R. REEVES, OF CANTON, OHIO.

*Letters Patent No.* 43,202, *dated June* 21, 1864; *reissue No.* 2,701, *dated July* 30, 1867.

IMPROVEMENT IN BRIDGES.

The Schedule referred to in these Letters Patent and making part of the same.

TO ALL WHOM IT MAY CONCERN:

Be it known that we, DAVID HAMMOND and W. R. REEVES, both of Canton, in the county of Stark, and State of Ohio, have invented new and useful Improvements in Wrought-Iron Girders for Bridges or other structures; and we do hereby declare that the following is a full, clear, and exact description of our invention, reference being had to the accompanying drawings, forming a part of this specification, and to the letters of reference marked thereon, of which drawings—

The nature of our invention is the novel construction of an arch and novel combination of an arch and string pieces, suspension rods, and diagonal braces, whereby we obtain a girder of great strength and stiffness with comparatively little weight.

To enable others skilled in the art to make and use our invention, we will proceed to describe its construction and operation.

Figure 1:
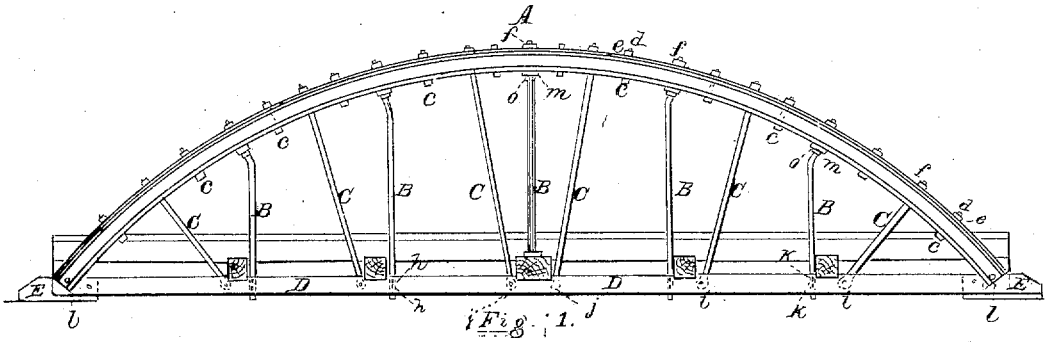
Figure 1 is a side view of our girder applied to a bridge.
Figure 2:
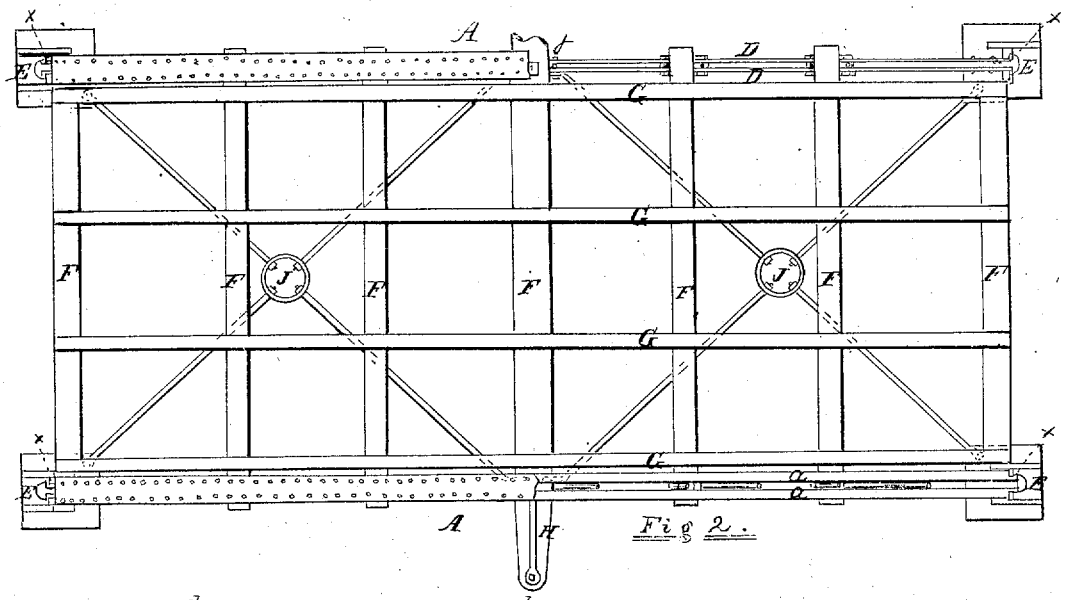
Figure 2 is a plan of the same.
Figure 5:
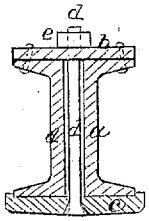
Figures 4 and 5 are views showing the arrangement of clamping piece.
Figure 4:
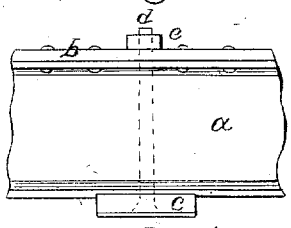
Figure 3:
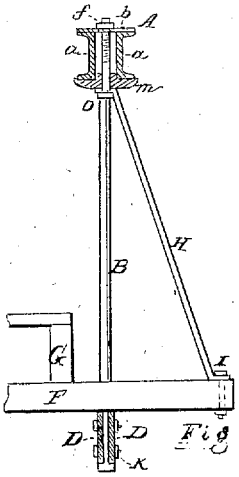
Figure 3 is a cross-section of one of the girders, showing the arrangement of the same.

The arch A of each girder is composed of two vertically continuous irons, *a a*, placed parallel to each other, having the covering piece *b* arranged on the top, as shown in fig. 3. The irons *a a* may be constructed of common plate iron or of channel iron, as shown, the channel iron being preferable. The top piece *b* is secured to the pieces *a a*, either by means of the clamping pieces *c* and bolts *d*, with nuts *e* thereon, or by riveting through the top pieces and flanges of the channel iron, the former being the mode for securing when the pieces *a a* are made of plate iron, and the latter, or both modes combined, when the pieces *a a* are of channel iron. The clamping pieces *c* are notched in so as to receive and fit the lower edge of the pieces *a a*, and have the bolts *d* passing through them and through the top piece *b*, being secured by nuts *e*, as fully shown in figs. 4 and 5. The string pieces D D are two continuous pieces of plate iron set up edgewise, and form a chord to the arch A. The chords D D are arranged in the shoes E, as shown in fig. 2, and the pieces *a a* have their bearing in the said shoes, and between the string pieces D D are placed the iron blocks X. The bolts *l* pass through the lips of the shoes E, the lower ends of the arch pieces *a a*, the string pieces D D, and the blocks X, thus firmly connecting the two ends of the arch to each other. The suspension rods B pass through the clamping pieces *n*, between the pieces *a a* of the arch A, and through the top piece *b* of the arch A, being secured by the nuts *f*, as shown in fig. 3. At their lower ends they pass between the string pieces D D, and are cut at their sides so as to receive the pieces D D, to which they are secured by bolts *k k*. The braces C are secured to the string pieces D D by the bolts *i i*, *j j*, the braces being placed between the chords, and having an eye at their lower ends, as indicated in figs. 1 and 2, and the bolts *i i*, *j j* passing through the eye in the braces, as before shown. These braces pass through the top piece *b* and are secured by nuts, as shown in fig. 1. The stringers F are laid on the chord D D, as shown, and have the pieces G G arranged on them, on which is placed the flooring of the bridge. To the middle stringer is attached the brace H, by means of the bolt I, the other end of said brace having an eye, through which passes the suspension rod B, and which is bolted between the pieces *a a* and the clamping piece *n*, as fully shown in fig. 3. The horizontal braces, which prevent any lateral vibration of the bridge, are secured to the chords by the bolts *j j* and to the shoe E, as shown, and unite in the rings J, and, by means of the nuts on their ends and inside of the ring J, can be drawn as tight as desired. The suspension rods B have the nuts *o*, which are below the clamping pieces *c c* or *n*, and which serve to bind the clamping closely to the pieces *a a* of the arch.

Having thus fully described our girder, what we claim as our invention, and desire to secure by Letters Patent, is—

1. The arch A, constructed of the side pieces *a a*, top piece *b*, clamping pieces *c c* and *n n*, bolts *d d*, nuts *e e*, the whole combined substantially as herein specified.

2. The combination of the arch A, constructed as hereinbefore specified, the string pieces D D, suspension rods B B, diagonal braces C C, and shoes E E, substantially as herein set forth.

As evidence we claim the foregoing, we have hereunto set our hands in presence of two witnesses.

DAVID HAMMOND,
W. R. REEVES.

Witnesses:
CHAS. F. MANDERSON,
E. N. BEEBOUT.